(12) United States Patent
Campbell

(10) Patent No.: US 11,906,453 B1
(45) Date of Patent: Feb. 20, 2024

(54) CANDLE COMBUSTION TESTING APPARATUS

(71) Applicant: Bruce Campbell, Loxahatchee, FL (US)

(72) Inventor: Bruce Campbell, Loxahatchee, FL (US)

( * ) Notice: Subject to any disclaimer, the term of this patent is extended or adjusted under 35 U.S.C. 154(b) by 0 days.

(21) Appl. No.: 18/151,183

(22) Filed: Jan. 6, 2023

Related U.S. Application Data

(60) Provisional application No. 63/283,566, filed on Nov. 29, 2021.

(51) Int. Cl.
  *G01N 25/22* (2006.01)
  *G01J 5/00* (2022.01)

(52) U.S. Cl.
  CPC ............ *G01N 25/22* (2013.01); *G01J 5/0018* (2013.01)

(58) Field of Classification Search
  CPC .............................. G01N 25/22; G01J 5/0018
  USPC ............................................................ 374/8
  See application file for complete search history.

(56) References Cited

U.S. PATENT DOCUMENTS

| | | | |
|---|---|---|---|
| 2,636,388 A | 4/1953 | Blegen | |
| 3,930,397 A | 1/1976 | Suga | |
| 6,669,468 B2 | 12/2003 | Pesu | |
| 6,758,869 B2 | 7/2004 | Roeske et al. | |
| 6,923,639 B2 | 8/2005 | Pesu et al. | |
| 7,226,284 B2 | 6/2007 | Avelar | |
| 7,410,513 B2 | 8/2008 | Requejo et al. | |
| 7,894,066 B2 * | 2/2011 | Behrendt | G01M 99/002 356/417 |
| 8,469,701 B2 | 6/2013 | Quinn et al. | |
| 10,619,846 B2 | 4/2020 | Decker | |
| 11,370,991 B2 | 6/2022 | Turner et al. | |
| 2003/0159472 A1 * | 8/2003 | Nakahara | G01N 21/59 65/485 |
| 2003/0171636 A1 * | 9/2003 | Hood | B01D 53/00 588/316 |
| 2006/0093979 A1 | 5/2006 | Varanasi et al. | |
| 2008/0158294 A1 * | 7/2008 | Katoh | B41J 2/1721 347/36 |
| 2010/0021855 A1 | 1/2010 | Requejo et al. | |
| 2011/0085030 A1 * | 4/2011 | Poe | F23G 7/085 382/103 |
| 2011/0121212 A1 | 5/2011 | Chen | |
| 2011/0294081 A1 | 12/2011 | McLaren et al. | |

(Continued)

FOREIGN PATENT DOCUMENTS

| | | | |
|---|---|---|---|
| CN | 108444951 A * | 8/2018 | ........... G01N 21/455 |
| CN | 111157668 A * | 5/2020 | |
| DE | 10208944 A1 * | 9/2002 | ............. G01N 21/59 |

OTHER PUBLICATIONS

EPO translation of CN 111189552A, published May 22, 2020 (Year: 2020).*

(Continued)

*Primary Examiner* — Mirellys Jagan
(74) *Attorney, Agent, or Firm* — Dunlap Bennett & Ludwig, PLLC; Anna L. Kinney

(57) ABSTRACT

A machine that automatically performs select tests on candles includes a pedestal onto which a candle is positioned. The machine also includes cameras, focused on the candle, to collect thermal emission and visual data resulting from a "candle burn". The machine is used in a "candle burn" test method.

8 Claims, 4 Drawing Sheets

(56) References Cited

U.S. PATENT DOCUMENTS

| | | | |
|---|---|---|---|
| 2011/0311925 A1 | 12/2011 | Chen | |
| 2018/0181094 A1* | 6/2018 | Funk | H04L 67/12 |
| 2020/0386596 A1* | 12/2020 | Zeng | G01F 25/10 |
| 2021/0404980 A1* | 12/2021 | Lépinay | G01N 33/28 |

OTHER PUBLICATIONS

Translation of KR-2157984-B1 (Ha eta l.) (Year: 2020).*
Home. CDAS: Candle Data Acquisition System. (Feb. 15, 2019). Retrieved Dec. 29, 2022, from http://candledas.com/.
YouTube. (Jul. 26, 2021). Candleapp—homepage product video. YouTube. Retrieved Dec. 29, 2022, from https://www.youtube.com/watch?v=Cyh_RukXA8M.
Candleapp. Sep. 27, 2021). Retrieved Dec. 29, 2022, from https://web.archive.org/web/20210927040428/https://cst-gmbh.eu/produkt/candleapp/.

* cited by examiner

CANDLE COMBUSTION TESTING APPARATUS

REFERENCE TO RELATED APPLICATION

This nonprovisional patent application is based upon U.S. provisional application Ser. No. 63/283,566 filed Nov. 29, 2021, incorporated by reference in its entirety.

FIELD

The present subject matter is directed, in general, to combustion of candles, and more particularly, to a portable machine that automatically measures candle combustion, thereby eliminating error that would otherwise result from visual observation by a human.

BACKGROUND

At the present time, candle-burn testing is performed by human visual observation, which typically results in guess-based measurement and/or other inaccurate information being recorded. Other results may include candles that tunnel, soot profusely, or exhibit large flames that may occasionally flash over to possibly cause a fire, damage, or injury.

The prior art was investigated to learn if any machines to automatically perform safe candle-burn test procedures are known. For instance, U.S. Pat. No. 2,636,388 to Blegen was investigated but found to be directed to an apparatus for testing the flammability characteristics of combustible sheeting material such as plastic film and fabric. U.S. Pat. No. 3,930,397 to Suga was investigated but found to be directed to an automatic combustion tester apparatus or machine, in which a Bunsen burner is provided. The burner is movable between a first position adjacent to a rigidly supported test piece and a second position spaced from the test piece. The Bunsen burner is connected by a first conduit to a lateral tube which, in turn, is connected by a second conduit to a gas bomb. A flame timer is used to control time during which a test piece is exposed to flames from the burner during a burn cycle. Another timer is used to control amount of time the flame is moved away from the test piece. A heat shield is provided along with means to move the heat shield from a first position between the test piece and burner and a second position further away.

U.S. Pat. No. 7,894,066 to Behrendt et al. was investigated but found to be directed to a machine that merely captures image data of a test piece. To capture image data, the machine uses a first camera, to determine a reference point of a test piece. The machine includes a burner (positioned a predetermined distance from the reference point) to perform an assortment of flame-exposure tests upon the test piece. The machine also uses a second camera to detect whether the test piece, when exposed to a flame, actually burns or merely "incandesces," a third camera to monitor the burner flame, and a fourth camera to determine if test pieces drip (and to what extent) while burning. The machine also includes a detector that detects if drips ignite a pad of wadding under the test piece.

US published patent application 2021/0404980 to Lépinay et al. was investigated but found to be directed to a machine used to determine smoke point of hydrocarbons. This machine is used to determine smoke points conforming to specifications associated with a testing standard commonly known as ASTM D1322-19 (or an equivalent standard). The machine includes various devices including: (1) an imaging device for taking a series of digital images of a flame; (2) an ambient relative humidity sensor for measuring relative humidity; (3) an ambient temperature sensor to measure temperature; and (4) a computer system linked to the imaging device, the humidity sensor, and the temperature sensor. The computer system, programmed to analyze digital images from the imaging device, measures flame height. The computer system is also programmed to use temperature and relative humidity data measured and recorded by the temperature and humidity sensors, to not only calculate absolute humidity but also correct measured flame height, as a function of a difference between the calculated absolute humidity and the normalized absolute humidity. The computer corrects the measured flame height, as a function of a difference between pressure during the flame height measuring and normalized pressure.

Unfortunately, no prior art testing machine was found to test candles. Procedures for testing candles typically involves gathering various data including but not limited to the candle weight loss and changes to the flame height during combustion, the degree and amount of visible emission of particulate material, referred to as "soot," generated during combustion testing and after a person "blows out" a lit candle, and measured shape and size of "burn pools" that form, with some of the measurements being explained in U.S. Pat. No. 11,370,991 to Turner et al.

Therefore, having a machine that automatically measures combustion of candles, for eliminating error otherwise resulting from visual observation by a human, is desirable.

SUMMARY

Accordingly, a machine to automatically measure candle combustion, for virtually eliminating error resulting from visual observation by a human, is summarized as follows.

The machine includes a housing defining an interior region, a pedestal onto which a candle can be placed, a first set of first and second cameras, each of which is adapted and configured for providing thermal information (or data) associated with the burning of a candle, and a second set of first and second cameras, each of which is adapted and configured for providing machine vision information (or data), for providing a 3D model of burning flame height. Hereinafter, these two sets of cameras shall simply be referred to as first and second thermal-and-machine-vision cameras. The machine also includes a third camera and industrial LED lighting panel to provide soot-based information (or data) associated with the burning of a candle. The machine further includes a system for automatically operating the machine, and sidewalls surrounding the interior region. The pedestal is located within the housing.

The first set of first and second cameras, adapted and configured for providing thermal information (or data) associated with the burning of a candle, are each an infrared camera, both being located within the housing in a mutually opposed manner for purposes of measuring, in three dimensions (hereinafter "3D measuring"), thermal radiation flowing from a burning candle. The measurement is in very accurate detail. The second set of first and second cameras, referred to as "machine vision cameras," are also located within the housing in a mutually opposed manner, for the purpose of 3D modeling light energy from the flame of a burning candle, for determining its burning flame height, in real time.

Figure 1:
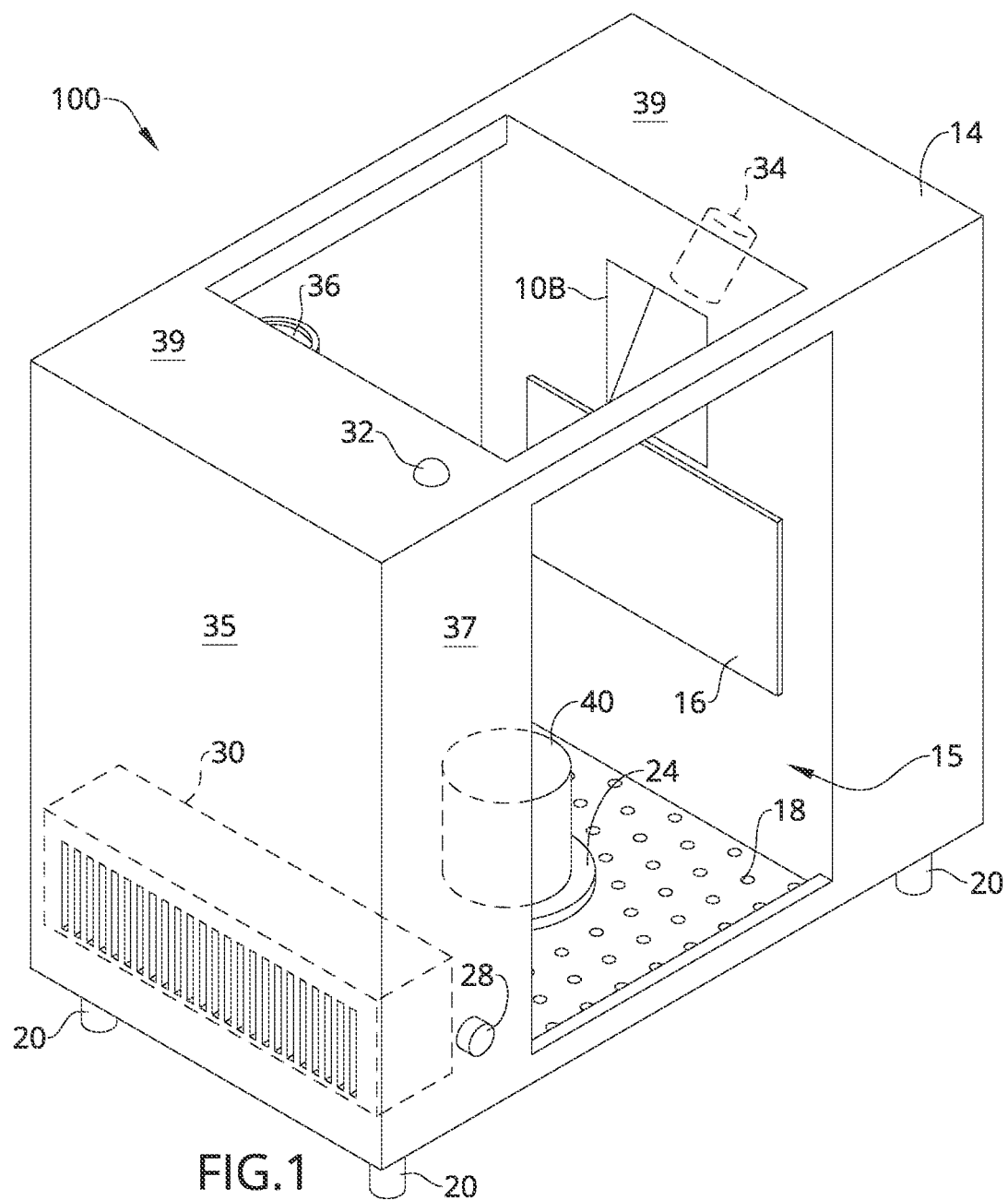
FIG. 1 presents an isometric view of an embodiment of an automatic candle-testing machine of the present subject matter, with the open (right) side shown being the front.

Throughout the drawing figures and the detailed description, similar alphanumeric references shall be used to refer to features of the present subject matter that are similar.

DETAILED DESCRIPTION

Figure 2:
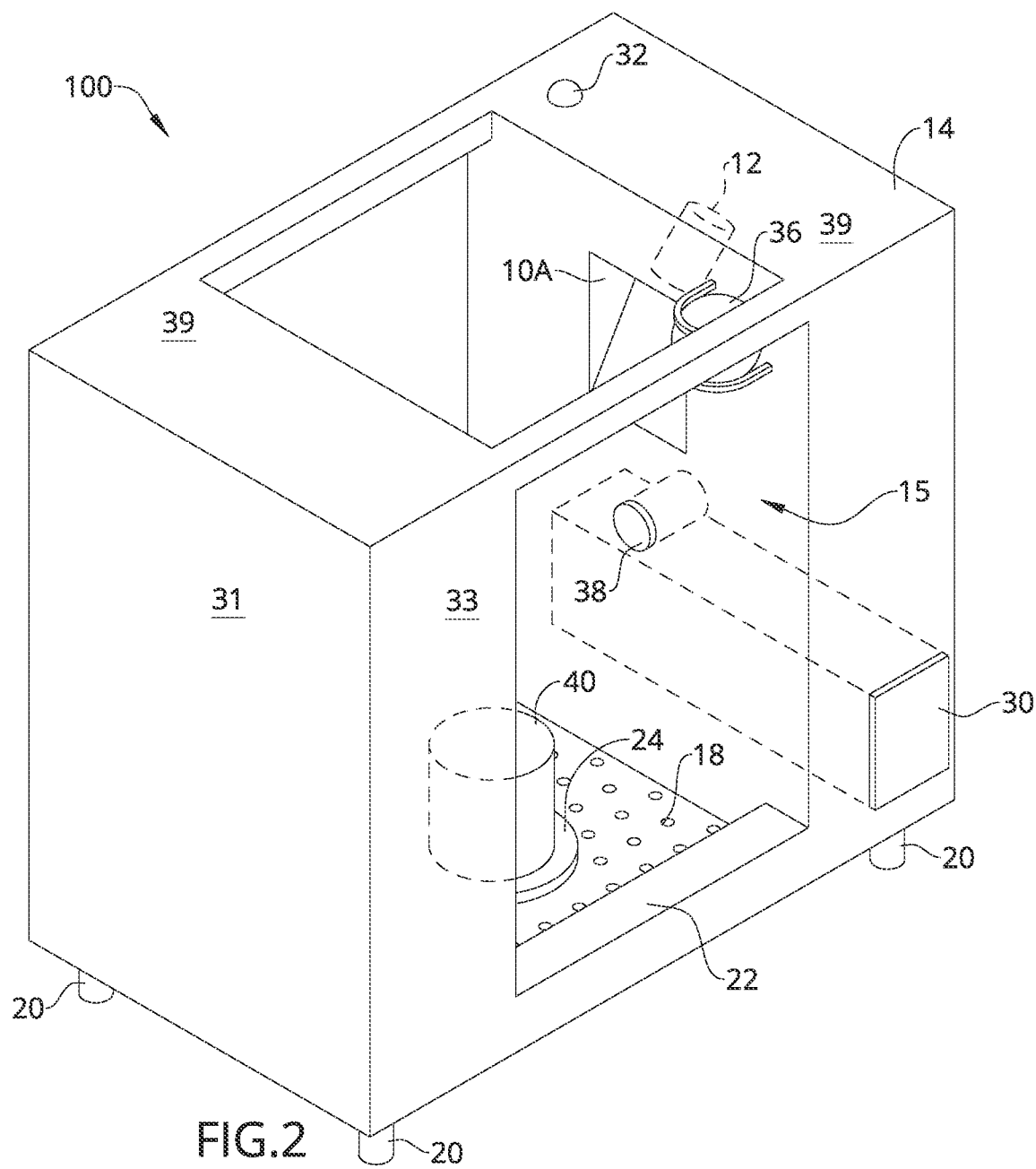
FIG. 2 is an isometric view presenting a backside of the machine shown in FIG. 1.

A machine 100 (FIGS. 1-3) for testing candles, capable of automatically viewing and recording thermal and visual information (also called "data" hereinafter) associated with the burning of a candle, by focusing upon its flame, shall now be described in detail.

The machine 100 comprises a housing 14 defining an interior region 15, and a pedestal 24 onto which a candle 40 can be placed. The housing 14 includes four sidewalls 31, 33, 35, 37 partially enclosing the interior region 15. The pedestal 24 is centrally located within housing 14. The machine includes first and second thermal-and-machine-vision cameras 12 and 34 (FIG. 3), both of which are located closely adjacent an upper surface 39 of the housing 14. The first set of thermal-and-machine vision cameras 12 is located closely adjacent a first sidewall 35; and the second set of thermal-and-machine-vision cameras 34 are located closely adjacent to a second sidewall 31, with the first set of thermal-and-machine-vision cameras 12 being arranged within a cavity 10A (FIG. 2) located between the sidewalls 33 and 37 and adjacent to the sidewall 35. The second set of thermal-and-machine-vision cameras 34 are arranged within a cavity 10B (FIG. 1) located between the sidewalls 33 and 37 and adjacent to the sidewall 31 of housing 14. The cameras 34 and an LED panel 16 adjacent to the sidewall 31 are coupled with electronic components 28, 30, 51, 53, 55, 57 adjacent to the sidewall 35 via a conduit 22.

Both cavities 10A and 10B have a surface, sloping downwardly toward the candle 40, for enabling the first and second sets of thermal-and-machine-vision cameras 12, 34 to be fixed to and oriented along these respective sloping surfaces, for the purpose of focusing the cameras 12, 34 upon a flame 41 of a burning candle 40 on the pedestal 24. Both sets of the thermal-and-machine-vision cameras 12, 34 are located closely adjacent an upper surface 39 of housing 14. In each first and second set of cameras 12 and 34, representative of the "thermal cameras," are a pair of infrared cameras, each oriented to be focused upon the flame 41 of a burning candle 40 from locations, within housing 14, which are 180° opposed, for measuring, in very accurate detail and in three dimensions, thermal radiation emanating from each flame 41 atop a burning candle wick, in real time. In each first and second set of cameras 12 and 34, representative of the "machine vision" cameras, are a pair of cameras, each oriented to be focused on the flame 41 of the candle 40 from locations within housing 14, which are 180° opposed, for modeling in very accurate detail in three dimensions, light energy emanating (or flowing) from the flame 41 atop the wick of the burning candle 40, to determine a "burning flame height," in real time.

The machine 100 of the present subject matter includes a third camera 38, located within the housing 14, oriented to view soot emanating from the wick of a burning candle illuminated by an industrial LED light panel.

The soot-detection camera 38 used is designed to record soot data associated with burning of a candle 40 by its flame 41 by compiling the number of pixels obscured by visible soot particles between camera 38 and LED panel 16.

The machine 100 includes an operating system 30 (FIG. 3), also located within the housing 14; the operating system 30 includes a memory device 51 operatively associated with each of the first and second thermal-and-machine-vision cameras 12 and 34 as well as the soot-detection camera 38, for storing thermal data from the pair of vision cameras (12, 34), 3D visual data from the pair of visual data cameras (12, 34), and soot data from the soot-detection camera 38. Data obtained and recorded individually by the cameras (12, 34, and 38) are conveyed to memory device 51 for storage and processed thereafter. The system 30 also includes a switch 28 for powering the machine 100 "on" and "off."

The machine 100 further includes a platform 18, providing a base or floor within interior region 15, onto which the pedestal 24 (supporting the candle 40) can be placed. The pedestal is attached to a load cell 26 for the purposes of recording weight loss as the candle burns real time.

U.S. Pat. No. 11,370,991 to Turner et al. is hereby incorporated by reference in its entirety for its disclosure and explanation of terms including but not limited to high melting point ("HMP") waxes, candles that exhibit a "tunnelling effect," a "wax melt pool", the melt pool formation and the "pool depth", flame-height-to-melt-pool ratio, and soot production, all of which help to understand the testing of burning candles. For instance, Low Melting ("LM") point wax usually melts at 128° F. (53° C.) or less. Waxes of this type are typically used for container candles, i.e., religious novena candles, and decorative, fragranced jar candles. Mid-Melting ("MM") point waxes usually melt between 128 and 145° F. (53-63° C.) and are often used for higher quality container candles, and free-standing candles.

In an embodiment of the machine 100 for testing candles of the present subject matter, the housing 14 is a metal (preferably noncorrosive) chamber open on three sides—i.e., the frontside (FIGS. 1, 3), the backside (FIGS. 2, 3), and the top—with a floor 18 with numerous holes or perforations of predetermined size formed entirely through it.

The sidewalls 31, 33, 35, and 37 of the housing 14 block room air currents from perturbing the flame 41, while perforations through the floor 18 along with the openings though the frontside and backside (FIG. 3) promote gentle, laminar airflow within interior region 15, for unperturbed burning of the candle 40 by the flame 41. If the temperature in the interior region 15 is above the melting point of the wax of a particular candle, some of the melted wax may flow through the floor perforations.

Figure 3:
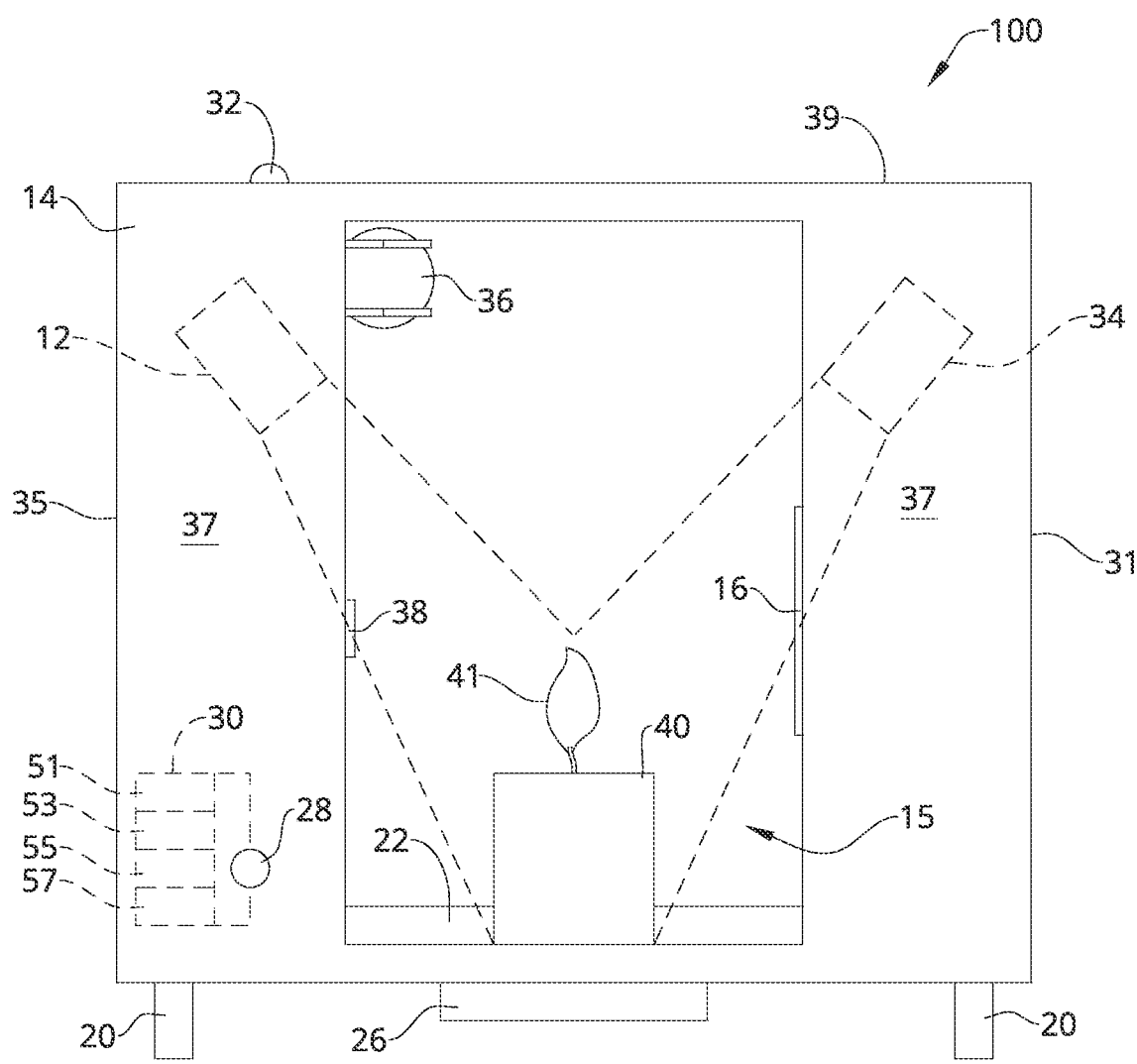
FIG. 3 is a front elevational view of the candle-testing machine depicted in FIG. 1.

The machine 100 further includes a backlight 16 disposed within the housing 14 and spaced from the soot-detection camera 38, with the pedestal 24, the candle 40 and its flame 41 disposed therebetween (FIG. 3). The backlight 16, an industrial-grade LED (light-emitting diode) light panel, made to generate a consistent array of photon energy upon a predetermined area, thereby provides a baseline of light to the soot camera 38 for enabling the soot camera 38 to detect pixel occlusion during the burning of the candle 40. As a result, the soot-detection camera 38, when operative, is automatically able to view and record high-quality soot data associated with the burning of the candle 40 by its flame.

The housing 14 includes four legs 20 extending from an underside surface, and an external light 32 for indicating that the machine 100 is operational when light 32 is lit and at what stage the testing is in by colors, green, orange, yellow, and red respectively. The machine 100 of the present subject matter includes a load cell 26 removably secured to an underside of the perforated platform 18. Load cell 26 is adapted for sensing an initial weight as well as a change-in-weight of a candle 40 placed on the pedestal 24. Load cell 26 is also adapted and configured to record and store information (data) relating to the initial weight and the change-in-weight of the candle 40 positioned upon the pedestal 24.

The machine 100 of the present subject matter further includes a thermally sensitive fire extinguisher 36, removably secured within the housing 14 closely adjacent to the upper surface 39. In embodiments, the fire extinguisher 36 dispenses a fire-extinguishing composition entirely throughout the interior region 15 of the housing 14 when the extinguisher 36 is heated to or above a predesigned temperature.

The machine 100, when portable and sized to be placed on a table (not shown), includes an operating system 30, configured for automatic operation of the "candle burn" testing machine 100 of the present subject matter. The operating system 30 (FIGS. 1-3) includes a processor 53 operatively connected to a memory device 51 (FIG. 3) and a touch-sensitive panel 55 designed to be intuitively and easily operated by a user or operator. The touch panel 55 is operatively connected to the processor 53. The operating system 30 also includes a portal 57. Users can connect their personal computer (PC) or Mac (neither shown) to the portal 57 to access the processor 53 and cause the processor 53 to analyze data in the memory device 51 and thereafter print reports downloadable to, and printable by, a printer (not shown), operatively connected to their PCs and/or Macs.

Figure 4:
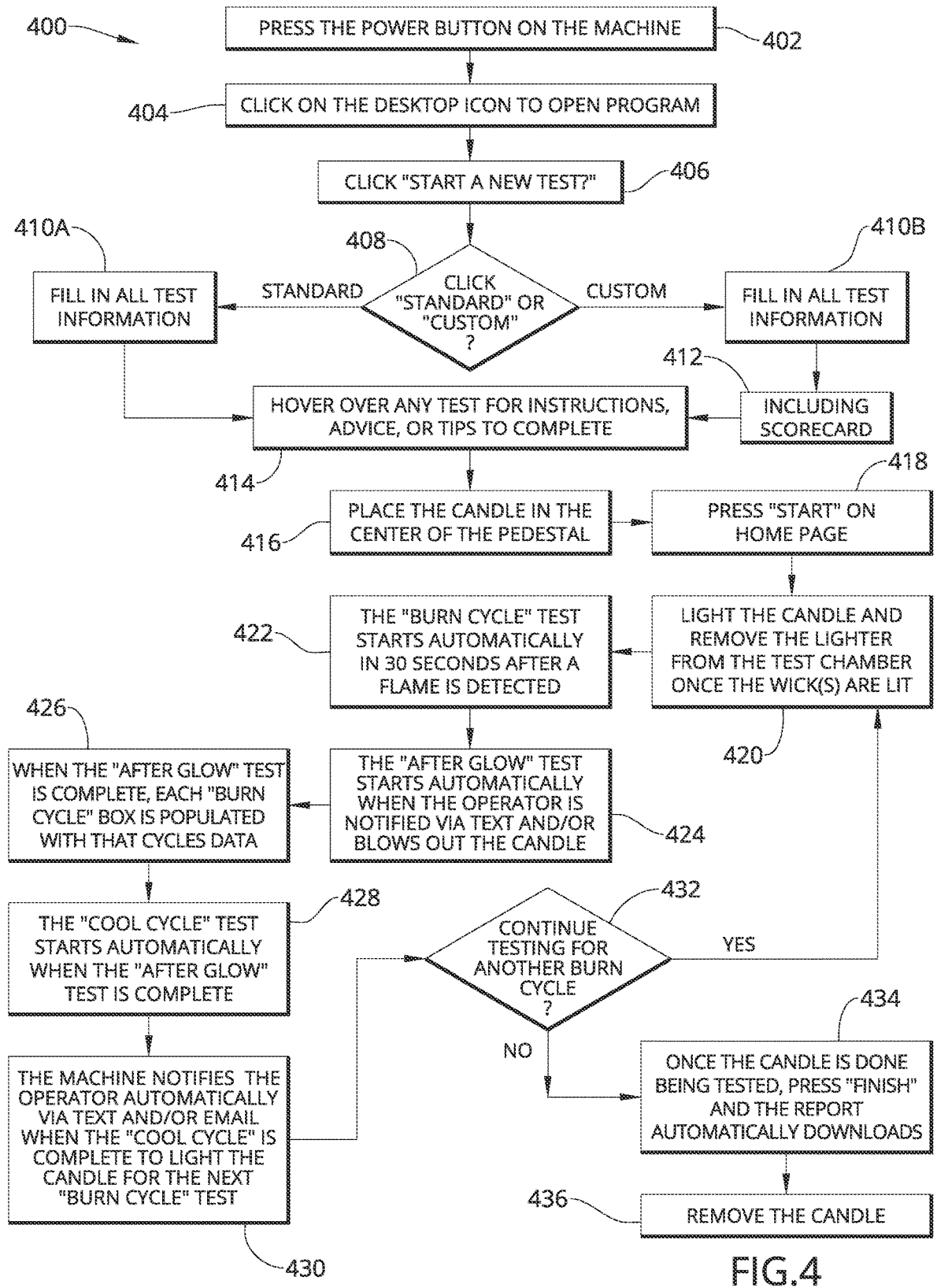
FIG. 4 is a process flow diagram presenting an illustrative method, including suggested steps, that operators of the illustrated embodiment of the testing machine of the present subject matter can do, for causing the machine to automatically test candles.

While certain users of the machine 100 of the present subject matter may want to use a custom desktop software program (having software programmed by a vendor), certain other users of machine 100 of the present subject matter will find the flow diagram of FIG. 4 adequate, for enabling a person with programming skills to write an application.

Accordingly, an embodiment of a method 400 (FIG. 4) for using the machine 100 of the present subject matter to automatically measure candle combustion shall now be described in detail. The method 400 comprises a series of steps beginning with step 402, which is for a user or operator to press the "Power Button" 28 to start the machine 100. (Please note, the method 400 being described is the basis of a software application, used by a user or operator of the machine 100, to perform the following steps.) Soon after the user or operator has used the portal 57 to connect a desktop PC or Mac to the operating system 30 of machine 100, an icon relating to the operation of machine 100 should appear on the screen of the PC or Mac. Thus, the next step, which is step 404, is for the user to "click on" the desktop icon to open the software program (of the application noted above). When ready to begin, the user or operator will perform the next step, step 406, which is to "click on" a "start a new test?" prompt appearing on the PC or Mac screen. Appearing soon thereafter on the screen, is a prompt, step 408, represented by a decision diamond, asking the user or operator whether the test to be performed is a "standard" test or a "custom" test. For either, steps 410A or 410B, the user or operator must fill in all test information highlighted in yellow at the top of the page on the PC or Mac screen being used. If a "custom test" the user fills in, step 412, all test information on either side of a "Custom Combination Scorecard." The next step, step 414, is for the user or operator to hover over prompts for tests (to be performed) for instructions, advice, or tips useful for completing the program requirements for test information needed before starting a test.

To begin a test, step 416, the operator positions a candle 40 in the center of the pedestal 24 (which functions as a 100% load-transferring plate for the load cell 26). Next, step 418, the operator presses a "start" button appearing on a home page of the PC or Mac screen. Within the test chamber of the machine 100, the next step, step 420, is for the operator to light the wick of a candle 40 (to be tested), now on the pedestal 24, using a lighter and, after the wick (or wicks if a candle to be tested has more than one wick) has (or have) become lit, removing the lighter from the test chamber. Thirty (30) seconds after a flame 41 (FIG. 3) is detected by the machine 100 (FIG. 1-3), a "Burn Cycle", step 422, will automatically begin. After this "Burn Cycle" has completed and its data is recorded in memory device 51, the machine 100 will send an email or text message to the operator, notifying the operator to "blow out" the candle 40; and, after the candle 40 is blown out, an "after Glow" test, step 424, will automatically be performed by the machine 100. After an "After Glow" test has competed, data associated with its test is automatically recorded, step 426, in the memory device 51. A "Cool Cycle" will automatically begin, step 428, after an "After Glow" test has been completed. Next, the machine 100 automatically notifies the operator, via a text or email message, whenever a "cool cycle" has completed, for the purpose of sending a "prompt" to the operator, step 430, to again light the candle 40 for another "burn cycle" test. At this point, the operator is at a second decision diamond and "clicks on" a prompt, step 432, to determine whether another burn cycle test needs to be performed or whether all burn cycle tests (to be performed) have, in fact, been performed and their data recorded in the memory device 51. If the user or operator "clicks on" a "yes" button on the screen of the PC or Mac (or a "yes" icon on the touch-sensitive panel 55, if used), the machine 100 automatically returns to step 420 and thereafter automatically performs all steps that follow, until again arriving at second decision diamond, step 432.

If no further "burn cycle" tests are to be performed, the operator can next either "click on" a "no" button on the screen of the PC or Mac (or press or touch a "no" icon on the touch-sensitive panel 55), or the operator can "click on" a "FINISH" button on the screen of the PC or Mac (or press or touch a "FINISH" icon on the touch-sensitive panel 55), and the machine 100 will automatically download, step 434, a "burn cycle" test report containing data of "burn cycle" tests performed for each burn cycle in memory device 51.

As a last step, step 436, for the method 400 described, and illustrated by the flow diagram presented in FIG. 4, the operator removes the candle 40 from the pedestal 24. If no additional candles are to be tested, the operator next pushes button 28 (FIGS. 1, 3) to turn the machine 100 off. However, if additional candles are to be tested, the operator next returns to step 406, and will "click on" a "start a new test?" prompt appearing on the PC or Mac screen, after which the machine 100 will be used for the next "burn cycle" test.

Currently, candle burn-testing procedures are performed by an operator viewing a burning candle wick, resulting in guess-based measurements which are often inaccurate. Moreover, relying upon an operator to collect candle-burning data could result in candles tunnelling, exhibiting dangerously large flames, or generating large amounts of soot, if an operator should become inattentive to the candle-burn test, or need to use a bathroom.

The machine 100 of the present subject matter eliminates data-collecting variation as well as "problems" resulting from inattentiveness to candle-burn tests being performed. In this way, the machine 100 of the present subject matter substantially reduces the possibility of human error by automatically testing candle combustion scientifically by using calibrated sensors, cameras, and software, all of which eliminate inconsistencies in results which, in turn, greatly improves reliability on recorded data, beyond human ability.

The present subject matter is thus directed to a portable machine 100 (FIGS. 1-3) which automatically measures the combustion (including a combustion rate) of a burning wick 41 on a candle 40, and thereby eliminates human error otherwise associated with collecting such data. The tabletop machine 100 of the present subject matter is adapted, configured, and easily programmed (see FIG. 4) to test candle combustion automatically, without human error, using calibrated scientific instruments. Measurements are extremely accurate and are quickly automatically quantified by machine 100 into easy-to-understand results, in which data is analyzed, summarized, and presented in written or electronic format, as reports, PowerPoint slides, etc., with or without figures, pie charts, and so forth.

Benefits provided by the present subject matter include but are not limited to use of the machine 100 to optimize candle design for combustion efficiency, since efficient combustion would improve the quality and safety of those consumers who burn candles.

Described within this patent specification is a machine, and its exemplary figures. The machine, designed to be used for testing candles, is configured for viewing burning candles. The machine automatically records thermal and visual data associated with a candle burn. Also described in this patent specification is a method, outlining steps used by the machine to automatically perform "burn cycle" tests. While the present subject matter has been described in connection with a current embodiment, the scope of the present subject matter is not to be limited to this embodiment. Indeed, many alternatives, changes, and/or modifications will become apparent to a person of ordinary skill in the art ("POSITA") after this patent specification and its figures are reviewed. Thus, alternatives, changes, and/or modifications are to be viewed as forming a part of the present subject matter insofar as they fall within the spirit and scope of the appended claims that follow.

I claim:

1. A machine (100) for testing candles by automatically viewing and recording thermal and visual data associated with the burning of a candle by its flame, comprising:
    a housing (14) defining an interior region (15), wherein the housing (14) includes a plurality of sidewalls (31, 33, 35, and 37) which partially enclose the interior region (15);
    a pedestal (24) onto which a candle (40) having a flame (41) associated with said candle (40) is placed, wherein the pedestal (24) is disposed within the housing (14);
    first and second thermal-and-machine-vision cameras (12, 34) located by an upper surface (39) in the housing (14), wherein the first camera (12) is located by a first sidewall (35) of the plurality of sidewalls (31, 33, 35, 37), wherein the second camera (34) is located by a second sidewall (31) of the plurality of sidewalls (31, 33, 35, and 37), and wherein the first and second cameras (12, 34) are each oriented to view and are configured to record the thermal and visual data associated with the burning of said candle (40) by its flame;
    a soot-detection camera (38) disposed in the housing (14) oriented to view and configured to record soot data associated with the burning of said candle by its flame; and
    a system (30) for automatically operating the machine, wherein the system (30) is disposed within the housing (14), wherein the system (30) includes a memory device (51) operatively associated with each of the first and second thermal-and-machine-vision cameras (12, 34) and the soot-detection camera (38), for storing the thermal and visual data, and the soot data, respectively recorded in relation to the burning of said candle by its flame, and wherein the system (30) includes a switch (28) for powering the machine on and off.

2. The machine (100) of claim 1, wherein the housing (14) includes a plurality of legs (20) extending from an underside surface thereof.

3. The machine (100) of claim 1, wherein the housing (14) includes an external light (32) for indicating that the machine (100) is operational when the light (32) is lit.

4. The machine (100) of claim 1, further including a programmable fire extinguisher (36), mounted in the housing (14) near the upper surface (39), wherein the extinguisher (36) is programmed to dispense a fire-extinguishing composition throughout the interior region (15) when the extinguisher (36) is heated to or above a preselected temperature.

5. The machine (100) of claim 1, further including a perforated platform (18) onto which the pedestal (24) supporting said candle (40) is put, wherein the platform (18) is disposed in the housing (14).

6. The machine (100) of claim 5, further including a backlight (16) disposed within the housing (14) and spaced from the soot-detection camera (38), with said candle (40) and its flame (41) disposed therebetween, for enabling the soot-detection camera (38) to view and record high-quality soot data associated with the burning of said candle (40) by its flame.

7. The machine (100) of claim 6, further including a load cell (26) disposed beneath the pedestal (24), wherein the load cell (26) is adapted to sense and record initial weight data and change-in-weight data of said candle placed on the pedestal (24), and wherein the load cell (26) is operatively connected to the memory device (51) for storing in the memory device (51) the initial weight data and the change-in-weight data of said candle placed on the pedestal (24).

8. The machine (100) of claim 7, wherein the system (30) includes a processor (53) operatively connected to the memory device (51), a touch-sensitive panel (55) operatively connected to the processor (53), and a portal (57) operatively connectable to a printer.

* * * * *